US008396734B2

(12) United States Patent
Mock

(10) Patent No.: US 8,396,734 B2
(45) Date of Patent: Mar. 12, 2013

(54) CONFLICT RESOLUTION MECHANISM FOR MANAGING CALENDAR EVENTS WITH A MOBILE COMMUNICATION DEVICE

(75) Inventor: Von A. Mock, Boynton Beach, FL (US)

(73) Assignee: Motorola Mobility LLC, Libertyville, IL (US)

( * ) Notice: Subject to any disclaimer, the term of this patent is extended or adjusted under 35 U.S.C. 154(b) by 1357 days.

(21) Appl. No.: 11/673,292

(22) Filed: Feb. 9, 2007

(65) Prior Publication Data

US 2008/0114716 A1 May 15, 2008

Related U.S. Application Data

(60) Provisional application No. 60/865,703, filed on Nov. 14, 2006.

(51) Int. Cl.
*G06Q 10/00* (2006.01)
(52) U.S. Cl. ............... 705/7.13; 705/5; 705/6; 705/7.16; 705/7.18; 705/7.19; 705/7.24
(58) Field of Classification Search ............... 705/5, 6, 705/7.16, 7.18, 7.19, 7.24
See application file for complete search history.

(56) References Cited

U.S. PATENT DOCUMENTS

| | | | |
|---|---|---|---|
| 5,724,417 A | 3/1998 | Bartholomew et al. | |
| 5,790,974 A * | 8/1998 | Tognazzini ............... | 455/456.5 |
| 6,732,080 B1 * | 5/2004 | Blants ....................... | 705/7.18 |
| 6,970,705 B2 | 11/2005 | Yoshimoto et al. | |
| 7,239,623 B2 | 7/2007 | Burghardt et al. | |
| 7,321,930 B2 | 1/2008 | Ferguson et al. | |
| 7,702,333 B2 | 4/2010 | Walker et al. | |
| 2004/0047282 A1 | 3/2004 | du Crest et al. | |
| 2004/0047292 A1 | 3/2004 | du Crest et al. | |
| 2005/0164681 A1 | 7/2005 | Jenkins et al. | |
| 2006/0031177 A1 | 2/2006 | Rule | |
| 2006/0123449 A1 * | 6/2006 | Ma et al. ................... | 725/58 |
| 2006/0133335 A1 | 6/2006 | Garcia-Martin | |
| 2007/0195751 A1 | 8/2007 | Cai et al. | |
| 2007/0260989 A1 * | 11/2007 | Vakil et al. ............... | 715/748 |
| 2007/0281674 A1 | 12/2007 | Mock et al. | |
| 2008/0033778 A1 * | 2/2008 | Boss et al. ................. | 705/9 |

OTHER PUBLICATIONS

"You can pick your friends", Marshall, Tom, InfoWorld, Aug. 7, 1995.*
The State Intellectual Property Office of the People's Republic of China, "Notification of the First Office Action", Chinese Pat. Appln. No. 200780019689.0, Aug. 4, 2010, pp. 1-26.
The State Intellectual Property Office of the People's Republic of China, "Notification of the First Office Action", Chinese Pat. Appln. No. 200780019689.0, Jun. 9, 2011, pp. 1-12.
Patent Cooperation Treaty, "PCT Notification of Transmittal of the International Search Report or the Declaration", PCT/US2007/64881, Sep. 22, 2008, pp. 1-8.
AT&T, Advanced Communication Management Features, Important Info & FAQs, http://www.usa.att.com/callvantage/faqs/advanced_services.jsp, 11 pages, Accessed May 30, 2006.

(Continued)

*Primary Examiner* — Akiba Allen

(57) ABSTRACT

The present invention discloses a method for handling scheduling conflicts. The method can include a step of conveying scheduled events to a mobile communication device. Times associated with the events can be analyzed to determine potential conflicts. A set of previously established conflict resolution rules can be applied to the potential conflicts. Recommendations for resolving the potential conflicts can be generated based upon the applied rules. A notification of the potential conflicts and the generated recommendations can be presented to a user of the mobile device through an interface of the mobile communication device. The notifications and recommendations can occur a sufficient time before the potentially conflicting events occur to permit anticipatory actions to be taken to alleviate the conflicts before their occurrence.

16 Claims, 3 Drawing Sheets

OTHER PUBLICATIONS

TimelyWeb software library, http://www.timeleyweb.com/free/BradcastByPhone-Autodialer__28095s.html, 2 apges, Accessed May 30, 2006.

Calls, free CRM.com, http://www.freecrm.com/call.html, 1 page, accessed May 30, 2006.

Send Word Now, http://www.sendwordnow.com, 1 page, accessed May 30, 2006.

Palm, Send Word for Treo Smartphones, http://www.palm.com/us/software/sendwordnow/, 3 pages, accessed May 30, 2006.

Palm, Send word Now: Frequently Asked Questions, http://www.palm.com/us/software/sendwordnow/faq.html, 8 pages, accessed May 30, 2006.

United States Patent and Trademark Office, "Non-Final Office Action Summary", U.S. Appl. No. 11/421,014, Jul. 14, 2008, pp. 1-20.

United States Patent and Trademark Office, "Final Office Action Summary", U.S. Appl. No. 11/421,014, Jan. 2, 2009, pp. 1-19.

United States Patent and Trademark Office, "Final Office Action Summary", U.S. Appl. No. 11/421,014, Sep. 15, 2009, pp. 1-22.

United States Patent and Trademark Office, "Final Office Action Summary", U.S. Appl. No. 11/421,014, Apr. 1, 2010, pp. 1-19.

United States Patent and Trademark Office, "Final Office Action Summary", U.S. Appl. No. 11/421,014, May 12, 2011, pp. 1-11.

U.S. Appl. No. 11/421,014, filed May 30, 2006, in the name of Von A. Mock, et al, entitled "Reservation of Mobile Station Communication Resources".

United States Patent and Trademark Office, "Notice of Allowance and Fee(s) Due" U.S. Appl. No. 11/421,014, Nov. 28, 2011, 7 pages.

* cited by examiner

CONFLICT RESOLUTION MECHANISM FOR MANAGING CALENDAR EVENTS WITH A MOBILE COMMUNICATION DEVICE

CROSS-REFERENCE TO RELATED APPLICATIONS

The present application claims the benefit of U.S. Provisional Application No. 60/865,703 filed 14 Nov. 2006, which is hereby incorporated by reference herein.

BACKGROUND

1. Field of the Invention

The present invention relates to mobile communication devices and, more particularly, to a conflict resolution mechanism for managing calendar events with a mobile communication device.

2. Description of the Related Art

Mobile communication devices have expanded communication boundaries to enable businessmen to productively conduct business while away from an office and to allow social networks to extend past geographic limits. In many ways, these mobile communication devices have become hubs upon which our lives revolve.

Many of the communication devices include data exchange capabilities and resident software applications. The software applications often include contact management software and scheduling software. At present, the mobile device is typically treated as a distributed component of a desktop system. That is, a user's primary calendar is maintained on a desktop computing system, which is periodically synchronized with the mobile device. Synchronization actions can be based upon wireless data transfers or wired transfers occurring when the mobile device is docked.

The synchronizations can be performed bidirectionally, but the limited input and output modalities available via the mobile device often make data entry/changes from the device a cumbersome process that is only performed occasionally. The same can be said for stand-alone scheduling software on mobile devices; it is a convenient addition to the device, yet is seldom used as a primary schedule management system.

To illustrate, consider difficulties in manually resolving scheduling conflicts from a mobile device. First, a user must notice a scheduling conflict, which should not be assumed because current mobile device applications do not automatically detect conflicts. Next, currently scheduled events must be viewed on a tiny display, which typically requires viewing multiple pages and scrolling. A user then attempts to adjust scheduled event times so they don't conflict, which is often a cumbersome process performed by using a touch screen, a stylus, and/or a tiny keypad. A user can then try to view, using multiple pages and scrolling again, the changes to confirm the changes are desired. Then, each meeting participant for a changed event needs to be contacted and informed of the change. This process is slow and error prone enough that users typically opt to wait and perform these actions from a desktop system or have an administrative person (contacted via the mobile device) perform the changes for them.

Mobile devices are not destined to remain relegated to an ancillary schedule management role. Current ones of these devices include presently unused capabilities that would significantly enhance schedule management systems. For example, an increasing number of mobile telephone devices include a location detection capability provided by a Global Positioning System (GPS) component. If a user is assumed to be located proximate to this mobile device, distances between scheduled event locations and a user location can be automatically considered when scheduling actions are performed. What is needed is a solution that integrates mobile devices into a schedule management system in a manner that better utilizes the capabilities of the mobile devices. Further, an ideal solution would enable a mobile device user to handle scheduling conflicts is an intuitive manner from the device itself.

SUMMARY OF THE INVENTION

A solution that permits scheduling conflicts to be handled from a mobile device. The mobile device can directly receive appointment requests for timed events. These events can be compared against previously scheduled events and potential conflicts can be automatically determined. Whenever a conflict is determined, a configurable conflict resolution profile based upon a set of previously established rules can be applied to resolve the conflict. Recommendations based upon these rules can be presented upon the mobile device to a device user, who can accept or reject the recommendations. The conflict resolution profile can be based upon a set of conditions and criteria, some of which are uniquely associated with the mobile device. For example, one of the criteria can be event location criteria, which can consider a current location of the mobile device, a location of the event, and estimated travel times. Other criteria can include event participant criteria, which can be weighted based upon a frequency of contact with participants as automatically determined from contacts conducted via the mobile device. Other criteria, such as event time criteria, an event importance rating, an event time leniency, telepresence options, and the like, can be considered by the conflict resolution profile and used to generate conflict resolution recommendations.

The present invention can be implemented in accordance with numerous aspects consistent with the material presented herein, for example, one aspect of the present invention can include a method for handling scheduling conflicts. The method can include a step of conveying scheduled events to a mobile communication device. Times associated with the events can be analyzed to determine potential conflicts. A set of previously established conflict resolution rules can be applied to the potential conflicts. Recommendations for resolving the potential conflicts can be generated based upon the applied rules. A notification of the potential conflicts and the generated recommendations can be presented to a user of the mobile device through an interface of the mobile communication device. The notifications and recommendations can occur a sufficient time before the potentially conflicting events occur to permit anticipatory actions to be taken to alleviate the conflicts before their occurrence.

Another aspect of the present invention can include a method for handling scheduling conflicts within a mobile telephony device. In the method, a mobile telephony device can be provided that includes a scheduling application. The mobile telephony device can receive scheduled events at different times. Each of the scheduled events can have an associated event time and event specific information. When each new scheduled event is received, the mobile telephony device can compare event times against times of events previously established within the scheduling application to determine potential conflicts. When conflicts are detected, the mobile telephony device can use a set of previously established conflict resolution rules to generate recommendations for resolving the detected conflicts. A notification of the detected conflicts and the generated recommendations can be automatically presented upon the mobile telephony device. A user response can be received through an interface of the mobile communication device, where the user response includes conflict resolution instructions. Entries in the scheduling application can be modified in accordance with the user response.

Still another aspect of the present invention can include a mobile communication device including an internal conflict resolution system for scheduled events. The device can include a scheduling software application for scheduling events and a location detection component for determining a location of the mobile communication device. The device can also include a conflict resolution manager for detecting potentially conflicting events and for providing a user with at least one recommendation for resolving the detected potentially conflicting events. The conflict resolution manager can base the recommendation on a set of data driven rules included in a user configurable conflict resolution profile. At least one of the data driven rules can compare a current position of the mobile communication device as determined by the location detection component with a location of at least one scheduled event.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interacts within a single computing device or interacts in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
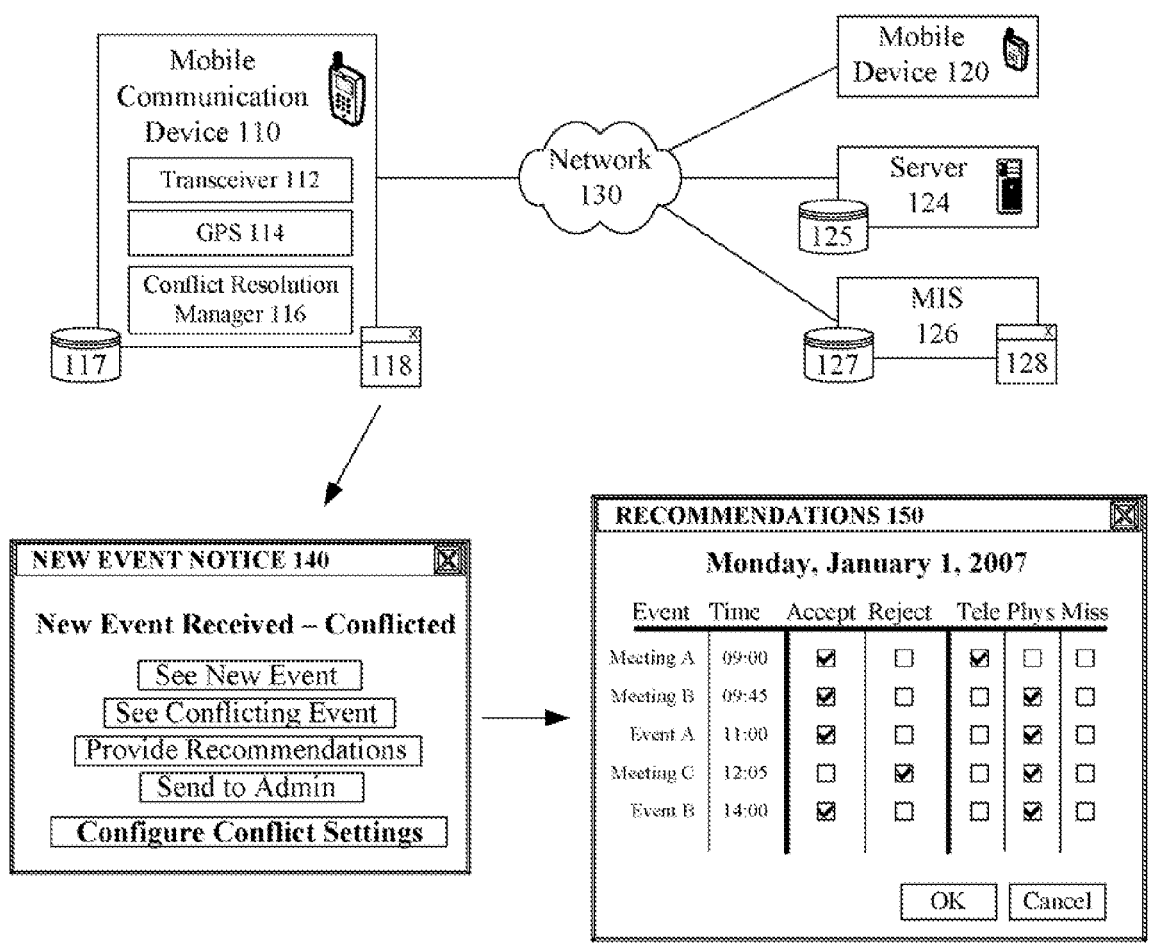
FIG. 1 is a schematic diagram of a system that includes a conflict resolution mechanism for managing calendar events with a mobile communication device in accordance with an embodiment of the inventive arrangements disclosed herein.

FIG. 1 is a schematic diagram of a system 100 that includes a conflict resolution mechanism for managing calendar events with a mobile communication device in accordance with an embodiment of the inventive arrangements disclosed herein. System 100 includes a mobile communication device 110 that manages scheduled events locally accessible via scheduling application 118. The mobile device 110 can include one or more transceivers 112 for exchanging information via a wireless personal area network (PAN) (e.g., BLUETOOTH and WIFI) and/or a wireless wide area network (WAN) (e.g., an Internet connection or a mobile telephony connection). Device 110 can also include a Global Positioning System (GPS) 114 component or other location determination component. A data store 117 can store user settings, scheduled events, device parameters, and other data elements.

The device 110 can receive appointment requests for new events via network 130 from other mobile devices 120, from a server 124, and/or from remotely located desktop systems 126. For example in one embodiment, a scheduling application 128 of a management information system (MIS) 126 can be periodically synchronized with a scheduling application 118 of the mobile device 110. In another embodiment, mobile device 110 can operate in a stand-alone manner that is independent of any external scheduling application 128.

Device 110 can include a conflict resolution manager 116 that automatically detects potential scheduling conflicts, that generates conflict resolution recommendations, and that takes further programmatic actions depending upon user responses to these recommendations. The recommendations can be based upon a configurable conflict resolution profile stored in data store 117. The conflict resolution profile can include a set of data driven conflict resolution rules. Data driving these rules can be contained in data store 117 and/or can be acquired from remote data sources, such as data store 125 and data store 127. Server 124 can represent a Web server from which any data available via the Web can be obtained. MIS 126 can represent an information system specific to a user of mobile device 110, such as a business information system or a home information system.

When a potential conflict is detected by conflict resolution manager 116 and/or when a new event is sent to device 110, a notice 140 can be presented to the user. The notice 140 can be presented within an interface of application 118. For example, the notice 140 can indicate that a new event appointment has been received that is conflicting with, an existing appointment. Options can be provided to see the new event, to see the conflicting event, to provide recommendations, to send the conflict to an administrative assistant, and/or to configure conflict settings. Configuring conflict settings can adjust conflict resolution rules of the conflict resolution profile.

Graphic User Interlace (GUI) 150 shows a potential conflict resolution recommendation, which can be presented when a user selects a corresponding option in GUI 140. GUI 150 can show each meeting/event of a given day. Each event can have an associated time and a number of selectable options. The options can include acceptance and rejection options. Each event can also include attendance options such as telepresence, physically present, and no attendance. The initially presented options in GUI 150 can represent automatically generated conflict resolution recommendations, which can be color coded (not shown) to show a user which presented events reflect a change from a previous schedule.

It should be appreciated that the layout and elements of GUIs 140 and 150 are for illustrative purposes only and that the invention is not to be construed as limited in this regard. Derivative or alternative arrangements and selection elements to those of GUI 140 and 150 are contemplated. For example, instead of showing GUI 150, a calendar view of events can be presented with highlighted events representing suggestions. In another example, a different GUI (not shown) could sequentially show a set of one or more conflicts and recommended resolutions, which a user could accept or reject.

Rejecting the option could call up alternative recommendations (not shown) and/or a manual conflict resolution GUI (not shown).

Additionally, the components shown in system 100 are to illustrate a concept and the invention is not limited to the precise details expressed. For example, in one contemplated embodiment the conflict resolution manager 116 can be implemented as component of MIS 126 and not a local component of device 110.

As used herein, each of the mobile devices 110 and 120 can be any computing device configured to convey voice and/or data messages over network 130. Different communication modes can be available to the devices 110 and 120, which can include telephone modes, two-way radio modes, instant messaging modes, email modes, video telecommunication modes, co-browsing modes, interactive gaming modes, image sharing modes, and the like. Mobile devices 110-120 can include mobile telephones, Voice over Internet Protocol (VoIP) phones, two-way radios, personal data assistants, mobile entertainment systems, computing tablets, notebook computers, wearable computing devices, and the like.

Network 130 can include any hardware/software/and firmware necessary to convey digital content encoded within carrier waves. Digital content can be contained within analog or digital signals and conveyed though data or voice channels. Network 130 can include network equipment, such as routers, data lines, hubs, and intermediary servers which together form a data or telephony network. Network 130 can include mobile communication components, such as cellular communication towers, two-way radio transceiving components, and the like.

Data stores 117, 125, and 127 can each he a physical or virtual storage space configured to store digital information. Each of data stores 117, 125, and 127 can be physically implemented within any type of hardware including, but not limited to, a magnetic disk, an optical disk, a semiconductor memory, a digitally encoded plastic memory, a holographic memory, or any other recording medium. The data stores 117, 125, and 127 can be stand-alone storage units as well as storage units formed from a plurality of physical devices. Additionally, information can be stored within data store 117, 125, and/or 127 in a variety of manners. For example, information can be stored within a database structure or can be stored within one or more files of a file storage system, where each file may or may not be indexed for information searching purposes. Further, data stores 117, 125, and/or 127 can utilize one or more encryption mechanisms to protect stored information from unauthorized access.

Figure 2:
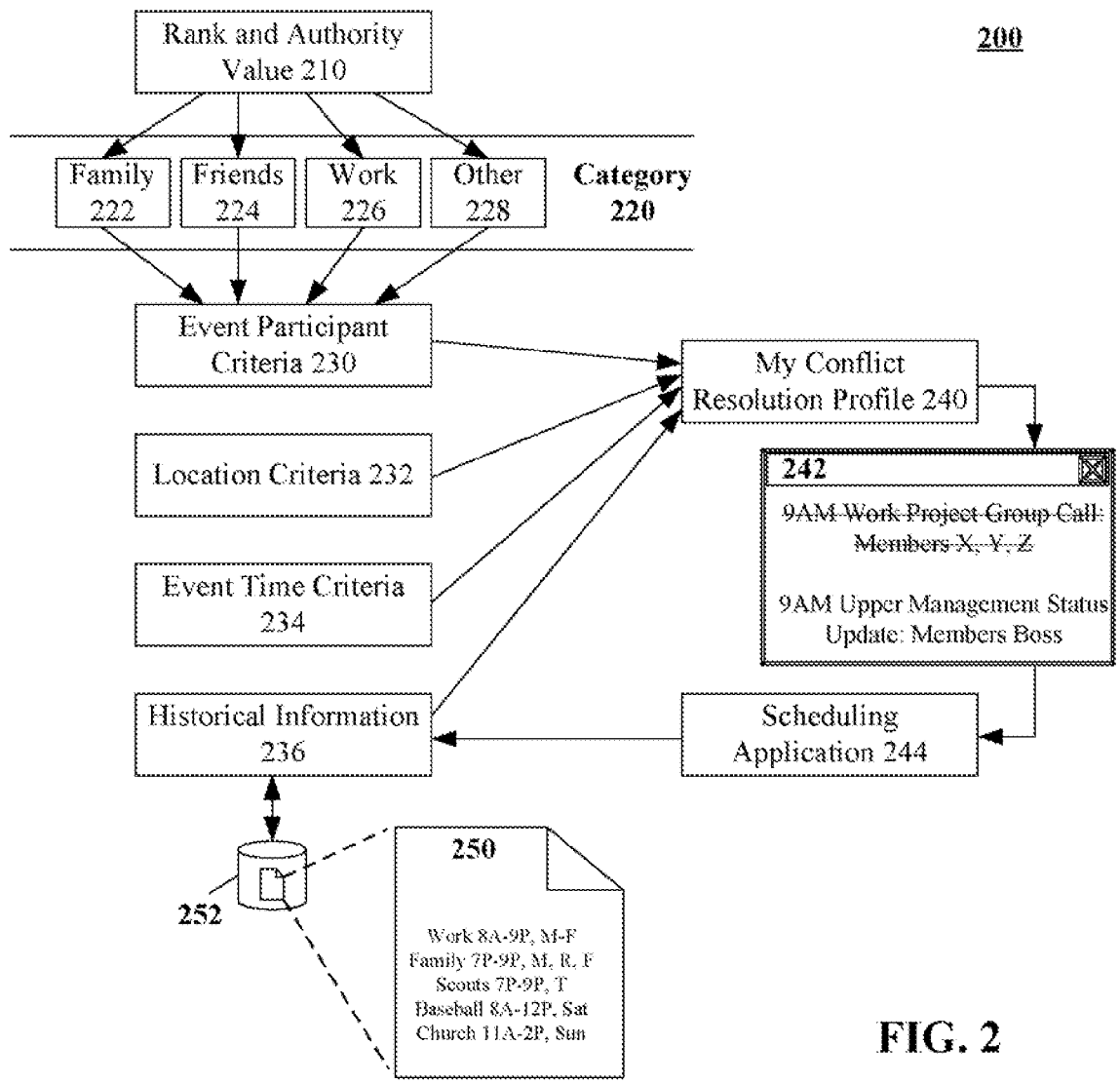
FIG. 2 is a schematic diagram of a system for implementing a conflict resolution system within a mobile device in accordance with an embodiment of the inventive arrangements disclosed herein.

FIG. 2 is a schematic diagram of a system 200 for implementing a conflict resolution system within a mobile device in accordance with an embodiment of the inventive arrangements disclosed herein. System 200 can be performed in the context of system 100.

System 200 can include a conflict resolution profile 240, which is a configurable profile used to apply a set of conflict resolution rules to conflicting events. The rules can be based upon numerous criteria, such as event participant criteria 230, location criteria 232, event time criteria 234, and the like. The conflict rules can also be based upon historical information 236. Conflict recommendations 242 can be presented to a user of a scheduling application 244 for user approval. User selections can be recorded in the historical information 236 and can be used to dynamically refine existing conflict rules. This represents an optional and continuous feedback/training loop that can be used to anticipate user desires regarding future scheduling conflicts.

The conflict resolution profile 240 provides an ability to provide conflict resolution recommendations based upon combinations of locations of a user/event, distances to an event and estimated travel time, event importance, telepresence availability for an event, social networking criteria, ownership of a mobile device, historical trends, event time flexibility, and the like.

To illustrate, location criteria 232 and event time criteria 234 can together indicate that a user is expected to attend two events occurring thirty miles apart, the first event ending within fifteen minutes of the start time of the second event. A present user location can be five minutes from the first event and forty minutes from the second event, estimated based upon driving distances, current traffic conditions, and a present location of a mobile device. Both the first and second events can have telepresence options, which are disfavored compared to physical attendance. Event participant criteria 230 can indicate that the first meeting is attended by long-term contacts and the second is attended by new contacts, where the long-term contacts would likely be more tolerant of telepresence participation, such as participation by teleconferencing. Further, the first meeting can include another company representative who is physically attending, while the second does not. Based upon all of this information, rules established within the profile 240 can recommend that a user begin driving to the second meeting to physically attend it while teleconferencing into the first meeting. Further, a notice to this effect can be automatically sent to the company representative attending the first meeting so that company representative can prepare as necessary. Further, any presentation data/slides can be automatically sent to a device of the company representative and/or to a meeting room computer so that the material is available for the first meeting.

Different events/participants can be categorized (category 220) into family 222, friends 224, work 226, and other 228. Historical information 236 stored in table 250 of data store 252 can establish that different categories 220 have different time-variable priorities. For example, a work category can receive an elevated priority for times of 8 AM to 9 PM from Monday to Friday. Family can receive elevated priority from 7 PM to 9 PM Monday, Thursday, and Friday; scouts from 7 PM to 9 PM on Tuesday; baseball from 8 AM to 12 PM on Saturday; Church from 11 AM to 2 PM on Sunday; and the like. Therefore, rules of profile 240 can prefer church-related events occurring between 11 AM and 2 PM on Sunday over baseball related events and can prefer baseball related events occurring between 8 AM and 12 PM on Saturday over church related events.

These rules illustrated by table 250 can be manually established by a user and/or can be automatically established by system 200 based upon available data. For example, if historical information 236 shows that church related activities are repetitively established on Sundays between 11 AM and 2 PM, church related activities can automatically receive an elevated priority for these times. Further, if historical information 236 shows that a user often skips scout meetings, these meetings can have relatively lower importance in a conflict resolution hierarchy over events, which the user rarely, if ever, misses. Attendance for a scheduled event can be automatically inferred/implied based upon event location and time that can be automatically compared against a mobile device location for these scheduled event times.

The location criteria 232 can be based upon participant 230 location information as well as user location information. For example, a participant requesting an in-person appointment with a user may override a different appointment with a second participant when the requesting participant is normally a large distance away from a user and spends little face-to-face time with the user. Appreciably, a location of the requesting participant can be provided by the participant or can be automatically obtained from a participant's mobile device. For example, a GPS component of the requestor's mobile device can show the requestor is local to the user. Additionally, BLUETOOTH or other proximity detection mechanisms can automatically detect that the requestor and user are proximate to each other. In one embodiment, one or more rules in profile 240 can further dynamically establish/suggest meetings of opportunity based upon a proximity of a user to one or more other individuals that are defined within a user specified list.

In one embodiment an elevated rank and authority value 210 can be assigned to events associated with participants 230 having an ownership interest in a mobile device that handles scheduling. For example, a mobile device or subscription for the same can be provided to an employee by a company or can be provided to a teen by a parent. The device owner can be automatically granted scheduling priority based upon this ownership interest alone. For example, an event submitted to a mobile device by a device user's boss (who pays for the mobile device) can have higher priority for conflict resolution purposes to an event submitted to the mobile device by a co-worker.

In another embodiment, weight values 210 for different participants 230 can be automatically calculated based upon a position of a participant within a user's social network. Different types of social networks (e.g., family 222, friends 224, work 226, and other 228) can have different levels of authority and rank 210 within each group. For example, within a family 222 group, parents can have a strong authority role and high rank 210 compared to other relations. Friends 224 can have a loosely coupled definition of authority where a number of communication links a user has with a particular friend 224 can determine a relative rank 210.

These links can dynamically vary over lime. For example, a friend 224 "in favor" with a user will typically be contacted with a higher frequency and duration than a different friend 224, which results in a higher relative rank and authority value 210. A friend 224 in a social network (without one or two hops of another friend) can have priority relating to a particular event over a further removed friend. For example, it can be assumed that a friend with a proximate social network connection is attempting to participate in or to "invite themselves to" an upcoming event, where a contact relating to a further removed friend (from a social networking standpoint) is unlikely to be directly related to the upcoming event, and is therefore afforded a lower relative priority. In another example, a rank and authority value associated with a set of friends can vary in accordance with event 234 and location 232 criteria. For example, if a social event involving a friend occurring proximate to a friend's location is about to occur, that friend can have enhanced conflict resolution priority compared to a different friend located further away.

Dynamic events can also result in an elevated rank and authority value 210 for a particular participant 230 for a particular event. For example, if a user's wife is pregnant, and an event relates to the pregnancy (e.g., the wife is having a baby) this event can have an extreme conflict overriding value compared to other events, such as a friend having a poker party. A worker 226 involved in an important project with the user can have priority over another co-worker unrelated to the project for that project's duration. Further rules can be established that elevate rank and value 210 for important participants who rarely interact with a user. For example, an event associated with a user's estranged brother can be granted priority over a different brother who frequently interacts with the user.

It should be appreciated that an exhaustive set of criteria 230-234 for a conflict resolution profile 240 is difficult if not impossible to fully enumerate. System 200 shows that static and dynamic criteria related to participants, events, locations, mobile device information, and historical information can be utilized for conflict resolution purposes. Any set of data driven conflict resolution rules for a profile 240 can be established and utilized in conjunction with the inventive arrangements disclosed herein.

Figure 3:
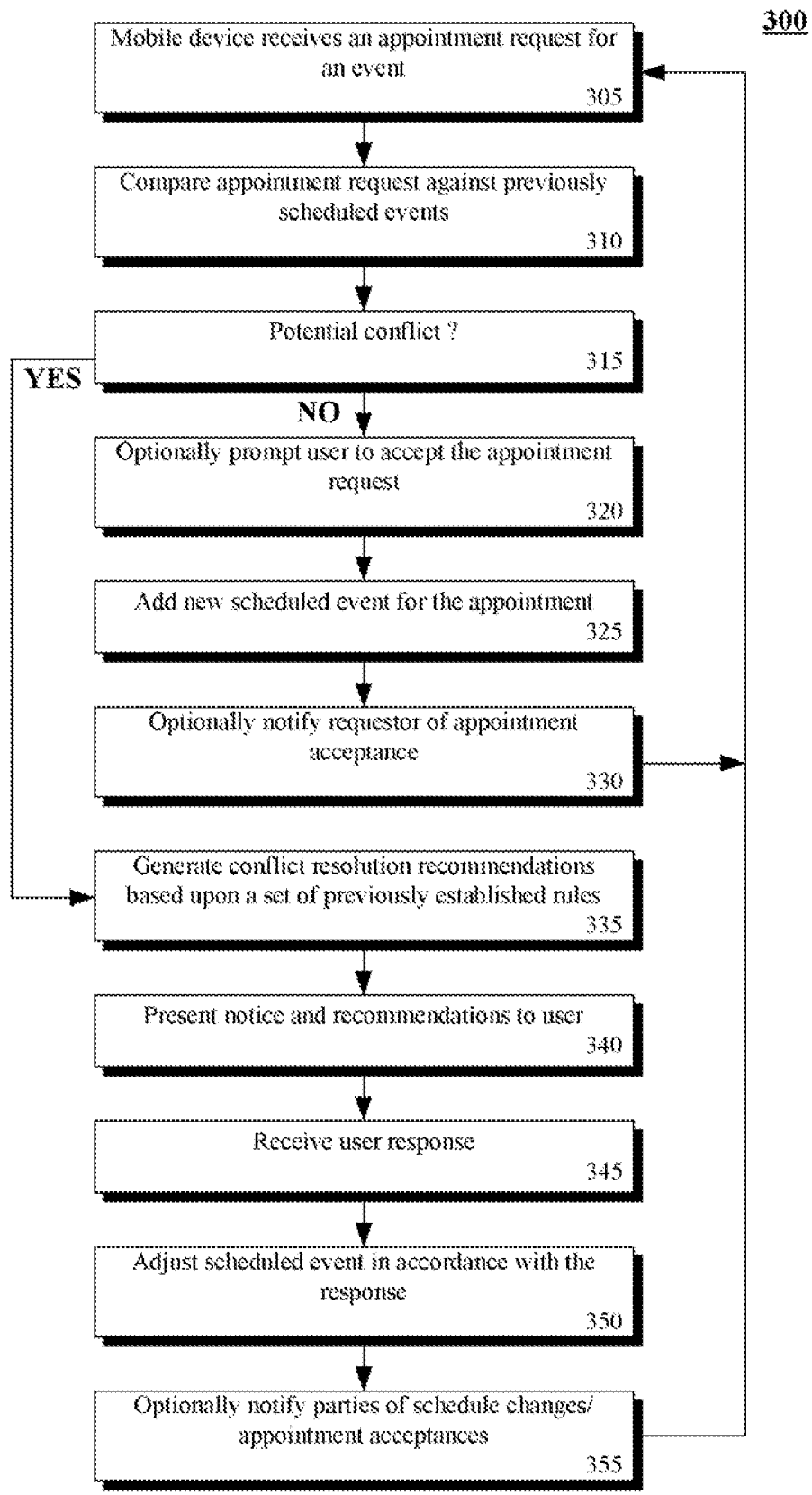
FIG. 3 is a flow chart of a method for managing scheduled events and potential conflicts to the same using a mobile communication device.

FIG. 3 is a flow chart of a method 300 for managing scheduled events and potential conflicts to the same using a mobile communication device. The method 300 can be performed in the context of system 100, a system 200, or any system where a mobile communication device is used to handle events.

Method 300 can begin in step 305, where a mobile communication device can receive an appointment request for participating in an event. In step 310, the appointment request can be compared against previously scheduled events. Step 315 can determine whether a potential conflict exists. If not, the method can proceed from step 315 to optional step 320, where a user of the mobile device can be prompted to accept the appointment request. If the appointment is refused (not shown) the method can skip from step 320 to step 305, where new appointment requests can be received.

When acceptance of the appointment is indicated in step 320 or if it is automatic when no conflicts are present, the method can proceed to step 325, where a new scheduled event can be added to a scheduling application associated with the mobile communication device. It should be appreciated that automatic acceptance of appointment requests can be based upon an identity of an appointment requestor, a subject matter of the request, and other such criteria. In step 330, a requestor can optionally he notified that the appointment has been accepted. The method can loop back to step 305, where new appointment requests can be received.

When a potential conflict is detected in step 315, the method can progress to step 335, where a conflict resolution recommendation can be generated. This recommendation can be based upon a set of previously established rules, such as those detailed in system 200. In step 340, a notification of the potential conflict and the recommendations can be presented to a user of the mobile communication device. In step 345, a user response can be received. In step 350, scheduled events can be adjusted in accordance with the user response. In step 355, parties affected by any scheduling event changes can be optionally notified. The method can then loop to step 305, where new appointment requests can be received.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may he embedded in a computer program product, which comprises all the features enabling the implementation of the methods described herein, and which, when loaded in a computer system, is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for handling scheduling conflicts comprising:
receiveing a plurality of scheduled events by a mobile communication device;
analyzing by the mobile communication device times associated with the events to determine potential conflicts;
applying by the mobile communication device a set of previously established conflict resolution rules to the potential conflicts;
generating recommendations for resolving the potential conflicts based upon the applied rules; and
presenting a notification of the potential conflicts and presenting the generated recommendations via an interface of the mobile communication device;
wherein the conflict resolution rules consider locations of the potentially conflicting events and an availability of telepresence options for participating in at least one of the potentially conflicting events, wherein the generated recommendations includes a recommendation to adjust a participation mode of at least one of the potentially conflicting events from physical attendance to a telepresence attendance.

2. The method of claim 1, further comprising:
receiving a user response to the presented notification and the recommendations through the interface of the mobile communication device, said user response including conflict resolution instructions; and
modifying a scheduling application in accordance with the user response.

3. The method of claim 1, wherein the scheduled events are managed by a scheduling application executing upon the mobile device, and wherein the analyzing, applying, generating, and presenting steps are performed by the mobile communication device using software programs executing upon the mobile communication device.

4. The method of claim 1, wherein the plurality of scheduled events are received at different times by the mobile communication device, and wherein the steps of presenting the notification and the generated recommendations occur a sufficient time before the potential conflict to preemptively resolve the potential conflicts.

5. The method of claim 1, wherein the conflict resolution rules consider a relative importance value associated with the potentially conflicting events and also consider temporal leniency regarding the times of the potentially conflicting events.

6. The method of claim 1, wherein each of the scheduled events are associated with an event location, wherein distances between scheduled events is considered by the analyzing step.

7. The method of claim 6, wherein the mobile device includes a location determination component that determines a current location of the mobile device, wherein at least one of the analyzing, applying, and generating steps utilizes the current location as an input item used in a conflict related calculation in combination with one or more event locations associated with scheduled events.

8. The method of claim 1, wherein the set of previously established conflict resolution rules include a rule based on a person associated with the scheduled event and that person's relative position within a social network of a user of the mobile communication device.

9. The method of claim 1, wherein the set of previously established conflict resolution rules include a rule based upon an entity paying a communication subscription for the mobile communication device or an entity having ownership in the mobile communication device, wherein a scheduled event associated with either the subscription paying entity or the entity having ownership takes priority over other scheduled events.

10. The method of claim 1, wherein the set of previously established conflict resolution rules include a rule based upon an anticipated user activity and an anticipated user location at a time that potentially conflicting events are to occur, wherein predictive algorithms for anticipating user activity and a user location are based upon historical information associated with a user of the mobile communication device.

11. The method of claim 1, wherein the set of previously established rules include at least two rules selected from a group of rules consisting of a rule based on locations of the scheduled events and a current location of the mobile communication device, a rule based on a person associated with the scheduled event and that person's relative position within a social network of a user of the mobile communication device, a rule based upon a person associated with the scheduled event and that person's financial responsibilities regarding at least one of a communication subscription for the mobile device and ownership interest in the mobile communication device, and a rule based upon comparing event times and event categories with time-variable priorities and priority categories established for a user of the mobile communication device.

12. The method of claim 1, wherein the set of previously established rules include at least three rules selected from a group of rules consisting of a rule based on location of the scheduled events and a current location of the mobile communication device, a rule based on a person associated with the scheduled event and that person's relative position within a social network of a user of the mobile communication device, a rule based upon a person associated with the scheduled event and that person's financial responsibilities regarding at least one of a communication subscription for the mobile device and ownership interest in the mobile communication device, and a rule based upon comparing event times and event categories with time-variable priorities and priority categories established for a user of the mobile communication device.

13. The method of claim 1, wherein the set of previously established rules include at least four rules selected from a group of rules consisting of a rule based on location of the scheduled events and a current location of the mobile communication device, a rule based on a person associated with the scheduled event and that person's relative position within a social network of a user of the mobile communication device, a rule based upon a person associated with the scheduled event and that person's financial responsibilities regarding at least one of a communication subscription for the mobile device and ownership interest in the mobile communication device, and a rule based upon comparing event times and event categories with time-variable priorities and priority categories established for a user of the mobile communication device.

14. A method for handling scheduling conflicts within a mobile telephony device comprising:
- providing a mobile telephony device that includes a scheduling application;
- the mobile telephony device receiving scheduled events at different times, each of said scheduled events having an associated event time and event specific information;
- when each new scheduled event is received, the mobile telephony device comparing event times against times of events previously established within the scheduling application to determine potential conflicts;
- when conflicts are detected, the mobile telephony device using a set of previously established conflict resolution rules to generate recommendations for resolving the detected conflicts;
- automatically presenting a notification of the detected conflicts and the generated recommendations upon the mobile telephony device;
- receiving a user response to the presented notification and the recommendations through an interface of the mobile communication device, wherein the user response includes conflict resolution instructions; and
- modifying entries in the scheduling application in accordance with the user response;
- wherein the conflict resolution rules consider locations of the potentially conflicting events and an availability of telepresence options for participating in at least one of the potentially conflicting events, wherein the generated recommendations includes a recommendation to adjust a participation mode of at least one of the potentially conflicting events from physical attendance to a telepresence attendance.

15. The method of claim 14, wherein the set of previously established conflict resolution rules include at least one rule selected from a group of rules consisting of a rule based on locations of the scheduled events and a current location of the mobile telephony device, a rule based on a person associated with the scheduled event and that person's relative position within a social network of a user of the mobile telephony device, a rule based upon a person associated with the scheduled event and that person's financial responsibilities regarding at least one of a communication subscription for the mobile telephony device and ownership interest in the mobile telephony device, and a rule based upon comparing event times and event categories with time-variable priorities and priority categories established for the user.

16. The method of claim 14, wherein the set of previously established conflict resolution rules include at least three rules selected from a group of rules consisting of a rule based on locations of the scheduled events and a current location of the mobile telephony device, a rule based on a person associated with the scheduled event and that person's relative position within a social network of a user of the mobile telephony device, a rule based upon a person associated with the scheduled event and that person's financial responsibilities regarding at least one of a communication subscription for the mobile telephony device and ownership interest in the mobile telephony device, and a rule based upon comparing event times and event categories with time-variable priorities and priority categories established for the user.

* * * * *